May 12, 1931.     P. W. HILLS     1,805,090
SHUTTLE AND METHOD OF MANUFACTURE
Filed Sept. 23, 1929
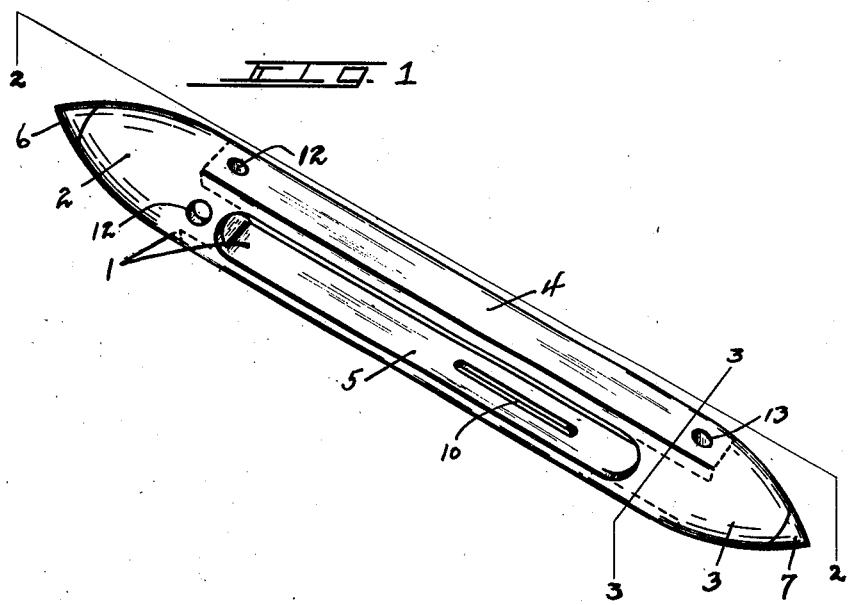
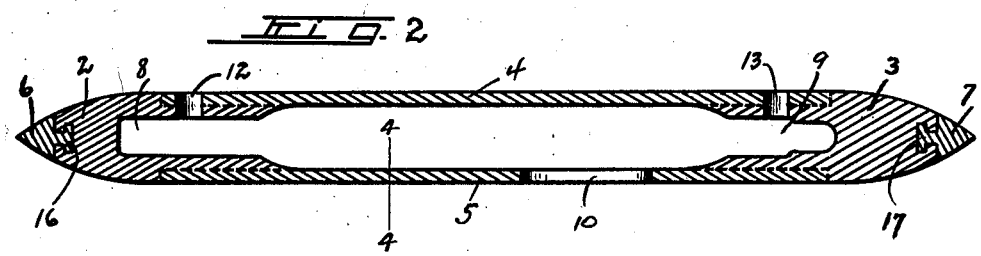
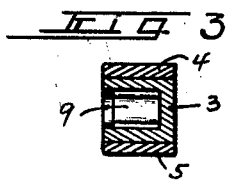
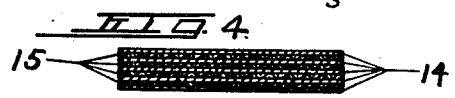
INVENTOR
Paul W. Hills
BY
Denison & Thompson
ATTORNEYS
WITNESS
J. J. Mains Patented May 12, 1931

1,805,090

UNITED STATES PATENT OFFICE

PAUL W. HILLS, OF AUBURN, NEW YORK, ASSIGNOR TO ALLEN AND HILLS, INCORPORATED, OF AUBURN, NEW YORK, A CORPORATION OF NEW YORK

SHUTTLE AND METHOD OF MANUFACTURE

Application filed September 23, 1929. Serial No. 394,551.

This invention relates to a new and improved shuttle and method of manufacture.

Shuttles which are used in weaving looms are subjected to great strain and stress during the operation of the machine because they are sent from one side to the other with great rapidity and at the end of their travel are stopped suddenly. This being the case it is necessary that they be very sturdy in construction.

It is also necessary that the surface of a shuttle be and continue to remain very smooth so that there will be little if any liability of the yarn or thread catching on the shuttle.

In order that the shuttle may carry a sufficiently large supply of yarn it is necessary that the middle part of the shuttle be open and this results in comparatively thin strips forming the middle portion of the sides of the shuttle.

Hitherto shuttles have usually been made of hard wood polished on the outside but the life of a wood shuttle is uneconomically short, due to the fact that in use the wood is apt to splinter to some extent with the result that the yarn will be caught on it and the shuttle must be retired from use until repolished.

Attempts have been made to manufacture shuttles from a phenol formaldehyde condensation product and such shuttles are a considerable improvement over wood shuttles because they are sturdy in construction and there is no liability of their surface becoming sufficiently roughened to catch the yarn.

It has been discovered however that shuttles which are made of a solid phenol formaldehyde condensation product while having ends which are sufficiently sturdy to withstand the rough usage to which they are subjected, the narrow strips forming the sides have not sufficient inherent resiliency to stand up under the strain of operation and they are apt to crack under the strain with the result that the shuttle cannot again be used.

Another material which has been used to make shuttles comprises a phenol formaldehyde condensation product in laminated relation to strips of canvas. This latter combination of materials cannot be moulded so when it is desired to make a shuttle from this type of material it is necessary to take a piece of stock and to machine the same into the shape desired and this method of manufacture is too expensive to be practical. However, a shuttle made out of this last described material is very satisfactory in use because the ends are sufficiently strong to stand up during operation while the sides have sufficient inherent resiliency so that there is no liability of their cracking during use.

The main object of my invention is to provide a shuttle which will combine the advantages of a phenol formaldehyde condensation product and the advantage of a laminated material formed from a phenol formaldehyde condensation product and strips of canvas.

Another object of my invention is to disclose a method of manufacturing a shuttle which will call for the minimum amount of machining and polishing.

Other objects and advantages relate to the size, shape and arrangement of the different parts of my device and to the different steps involved in the manufacture of the same, all as will more fully appear from the following description taken in connection with the accompanying drawings in which:

Figure 1 is a perspective view of my improved shuttle.

Figure 2 is a section on line 2—2 of Figure 1.

Figure 3 is a section on line 3—3 of Figure 1.

Figure 4 is a section on line 4—4 of Figure 2, enlarged.

The shuttle 1 consists of an end portion 2 and opposite end portion 3 joined together by side members 4 and 5. At the outer end of end portion 2 is provided a metal tip or striker 6 and a similar metal tip or striker 7 is provided in the end of end portion 3.

The particular design of the interior of a shuttle depends upon the use to which it is to be put and in this instance I have indicated a shuttle which is provided with a recess 8 in end portion 2 and a two step recess 9 provided in end portion 3. A slot 10 is provided in side member 5. In end portion 2 are also provided apertures 12 and 12' and an aperture 13 is provided in end portion 3.

End portions 2 and 3 are made of a phenol formaldehyde condensation product which is molded under heat and pressure, tips 6 and 7 being first placed in the ends of the mold so that they will become firmly imbedded in end portions 2 and 3 respectively.

Side members 4 and 5 are constructed of a laminated material composed of alternating strips of a phenol formaldehyde condensation product and canvas or other fabric, such built up structure being subjected to heat and pressure so that it forms a homogeneous mass. In Figure 4 I have indicated layers as 14 of a phenol formaldehyde condensation product and layers as 15 of canvas or other fabric. A laminated material made in the manner just described cannot be molded but it possesses an inherent resiliency considerably greater than the inherent resiliency of the solid molded material which is used for the end portions 2 and 3. This inherent resiliency possessed by the side portions 4 and 5 which are comparatively thin permits them to flex during use so that there is no liability of their cracking.

For the purpose of strengthening the end members 2 and 3 I prefer to incorporate with the phenol formaldehyde condensation product, and before the molding operation, a certain percentage of macerated canvas or other textile material which does not interfere with the molding operation but which aids in making the end members 2 and 3 sufficiently sturdy to stand the hard usage to which they are subjected.

In manufacturing my shuttle the side portions 4 and 5 of the laminated material heretofore described are placed in longitudinally extending recesses in a mold, none here being shown, and the ends of the mold are then filled with the phenol formaldehyde condensation product, the inner ends of the same being in overlapping relation with the ends of the side portion 4 and 5, the tips 6 and 7 also being placed in recesses in the ends of the mold with their headed shanks 16 and 17 extending into the phenol formaldehyde condensation product in the mold.

The material in the mold is then subjected to heat and pressure in the usual manner employed when materials of this character are molded. This operation forms the end portions 2 and 3 into a homogeneous mass of great strength and solidity and at the same time, the ends of the side strips 4 and 5 which are in contact with the phenol formaldehyde condensation product in the mold are permanently joined thereto and for all practical purposes become integral therewith so that when the shuttle is removed from the mold it is in effect a solid and complete article.

As heretofore described a shuttle manufactured by this method has solid, sturdy ends molded into the shape desired and sufficiently strong to withstand the rough usage to which the shuttle is subjected while the sides of the shuttle are composed of a material, which, while not moldable, is sufficiently strong and is possessed of sufficient inherent resiliency so that during use there will be no liability on the part of the side members of the shuttle to crack as they will compensate for the shocks received by them by springing slightly.

I have here spoken specifically of phenol formaldehyde condensation product as being a material that is well adapted for use in the manufacture of my shuttle but it will be understood that any moldable material which becomes tough and hard after the molding operation may be employed as may be laminated materials of different kinds although I prefer to use the type of moldable material which is subjected to the action of heat and pressure during the molding operation, my desire being to produce in the simplest and most economical way a shuttle which has hard, solid ends joined by side members with a considerable degree of inherent resiliency.

It will also be understood that the particular shape of the shuttle is immaterial as are the sizes of the ends in relation to the side members and it will also be understood that the specific way described for assemblying the parts during the molding operation may also be varied provided only that the end portions are properly joined to the side portions during the molding operation for, although I have shown and described a specific structure and form of part and a specific way of manufacturing such structure, I do not desire to restrict myself to the exact size, shape or arrangement of parts or to the precise method of manufacture here described as various changes may be made within the scope of the appended claims without departing from the spirit of my invention.

I claim:—

1. In a shuttle, molded end portions and opposed side members having their opposite ends joined to the molded end portions, said side members being reinforced with fabric.

2. In a shuttle, molded end portions and opposed side members having their opposite ends joined to the molded end portions in overlapping relation, said side members being reinforced with fabric.

3. In a shuttle, molded end portions and opposed side members of laminated material having their opposite ends joined to the end portions.

4. In a shuttle, molded end portions and opposed side members of laminated material having their opposite ends joined to the end portions in overlapping relation.

5. The method of manufacturing a shuttle comprising placing in a shuttle mold side members which have been previously reinforced with fabric, filling the remainder of the mold with a moldable material, portions thereof being in physical contact with the ends of the side members, and subjecting the contents of the mold to heat and pressure.

6. The method of manufacturing a shuttle comprising placing in a shuttle mold laminated side members, filling the remainder of the mold with a moldable material, portions thereof being in physical contact with the ends of the side members, and subjecting the contents of the mold to heat and pressure.

7. The method of manufacturing a shuttle comprising forming side members of a molded phenol formaldehyde condensation product and fabric in laminated relation, placing such side members in a shuttle mold, filling the remainder of the mold with a phenol formaldehyde condensation product, portions thereof being in physical contact with the ends of the side members, and subjecting the contents of the mold to heat and pressure.

8. The method of manufacturing a shuttle comprising forming side members of a material which has been made by placing a moldable material and fabric in laminated relation and subjecting the same to heat and pressure, placing such side members in a shuttle, filling the remainder of the mold with a moldable material, portions thereof being in physical contact with the ends of the side members, and subjecting the contents of the mold to heat and pressure.

9. The method of manufacturing a shuttle comprising forming side members of a material which has been made by placing moldable material and fabric in laminated relation and subjecting the same to heat and pressure, placing such side members in a shuttle mold, filling the remainder of the mold with a moldable material of the same properties as that used in making the material for the side members, portions of such moldable material being in physical contact with the ends of the side members, and subjecting the contents of the mold to heat and pressure.

10. In a shuttle, opposed end portions formed of a solid phenol formaldehyde condensation product and opposed side portions of a phenol formaldehyde condensation product and fabric in laminated relation.

In witness whereof I have hereunto set my hand this 6 day of September 1929.

PAUL W. HILLS.